United States Patent
Chopra et al.

(10) Patent No.: US 10,442,231 B1
(45) Date of Patent: Oct. 15, 2019

(54) TEXTILE PRETREATMENT FOR DIGITAL PRINTING

(71) Applicants: Xerox Corporation, Norwalk, CT (US); Palo Alto Research Center Incorporated, Palo Alto, CA (US)

(72) Inventors: Naveen Chopra, Oakville (CA); Paul J. McConville, Webster, NY (US); Jennifer L. Belelie, Oakville (CA); Anthony S. Condello, Webster, NY (US); Robert A. Street, Palo Alto, CA (US); Warren Jackson, San Francisco, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/928,658

(22) Filed: Mar. 22, 2018

(51) Int. Cl.
*B41M 5/00* (2006.01)
*D06P 5/00* (2006.01)
*B41J 3/407* (2006.01)
*C09D 4/00* (2006.01)
*B41J 11/00* (2006.01)
*D06P 5/30* (2006.01)

(52) U.S. Cl.
CPC .......... *B41M 5/0017* (2013.01); *B41J 3/4078* (2013.01); *B41J 11/0015* (2013.01); *B41M 5/0047* (2013.01); *C09D 4/00* (2013.01); *D06P 5/002* (2013.01); *D06P 5/30* (2013.01)

(58) Field of Classification Search
CPC ....................................................... B41J 3/4078
See application file for complete search history.

(56) References Cited

U.S. PATENT DOCUMENTS

| 5,612,281 | A | * | 3/1997 | Kobayashi | B41M 5/5218 |
| | | | | | 347/105 |
| 2001/0052312 | A1 | * | 12/2001 | Codos | B41J 2/01 |
| | | | | | 112/475.08 |
| 2004/0001678 | A1 | * | 1/2004 | Chiasson | G02B 6/4482 |
| | | | | | 385/114 |
| 2007/0218221 | A1 | * | 9/2007 | Friour | B41M 5/5218 |
| | | | | | 428/32.17 |
| 2009/0226605 | A1 | * | 9/2009 | Chopra | C09D 11/322 |
| | | | | | 427/125 |
| 2009/0293209 | A1 | * | 12/2009 | Chung | B41J 2/17559 |
| | | | | | 8/445 |
| 2013/0218241 | A1 | * | 8/2013 | Savoy | A61F 7/007 |
| | | | | | 607/98 |
| 2015/0321467 | A1 | * | 11/2015 | Moorlag | B41J 2/0057 |
| | | | | | 347/103 |
| 2018/0086587 | A1 | * | 3/2018 | Kim et al. | B65H 35/06 |

* cited by examiner

*Primary Examiner* — Shelby L Fidler
(74) *Attorney, Agent, or Firm* — Hoffman Warnick LLC

(57) ABSTRACT

The present teachings include a process, system and article for forming a printed image on a textile. The process includes coating the solution of an orthosilicate to form a silica network on the textile. The process includes applying an ink composition to the textile having the silica network on the textile, forming an image.

11 Claims, 3 Drawing Sheets

TEXTILE PRETREATMENT FOR DIGITAL PRINTING

BACKGROUND

Field of Use

This disclosure is generally related to the field of printing and, more particularly, to novel methods and apparatuses for high-resolution, high-definition multicolor direct printing on textile surfaces.

Background

Industrial printing on textiles is performed using processes such as screen-printing or dye-sublimation. These processes are time-consuming, and are not amenable to short-run, variable pattern print runs, or printing directly on objects, such as footwear. Digital printing of textiles is currently only 2.9% of the total textile printing market. However, digital printing of textiles is expected to grow. Substrates with poor wetting properties are not designed to receive printing inks as color saturation and image robustness is lacking.

SUMMARY

According to various embodiments, there is disclosed a method of printing an image on a textile. The method includes coating and curing the textile with a composition including an orthosilicate, a water miscible solvent, water and ammonium hydroxide, thereby creating a silica network attached to the textile. The method includes applying an ink composition the silica network, forming an image on the silica network.

According to various embodiments, there is provided a system for printing an image on a textile. The system includes a coating station for applying a composition including an orthosilicate, a water miscible solvent, water and ammonium hydroxide to the textile to create a silica network on a textile. The system includes an ink jet printer for applying an ink composition to the textile to form an image.

According to various embodiments there is disclosed a printed article. The printed article includes a fabric having a silica network on a surface of the fabric and a cured ink composition disposed on the silica network on the surface of the fabric.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1A:
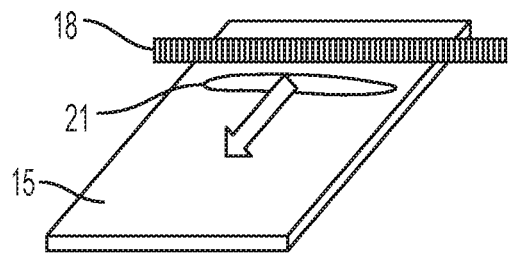
FIGS. 1A-1C show schematic depictions of a textile undergoing a method according to embodiments disclosed herein.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein is a process for treating textiles including synthetic fabrics, such as polyester, to improve the digital printing of images on such fabrics. Digital printing includes using ink-jet printers and aerosol printers.

Inkjet printing is a type of computer printing that recreates a digital image by propelling droplets of ink onto a substrate. Ink jet material deposition uses inkjet technologies, typically print-heads using piezoelectric crystals, to deposit materials directly on substrates.

In order to overcome the textile wettability issue a pretreatment process for coating a textile or fabric with silica derived from hydrolysis of an orthosilicate. In embodiments, orthosilicates that may be used include terraethyl orthosilicate (TEOS), tetramethyl orthosilicate (TMOS), tetraisopropoyl orthosilicate (TIPS), tertrabutyl orthosilicate (TBOS). The resultant textile or fabric coating will have a surface roughness to increase the textile or fabric receptivity for ink. The reaction of TEOS to create a silica network is shown below.

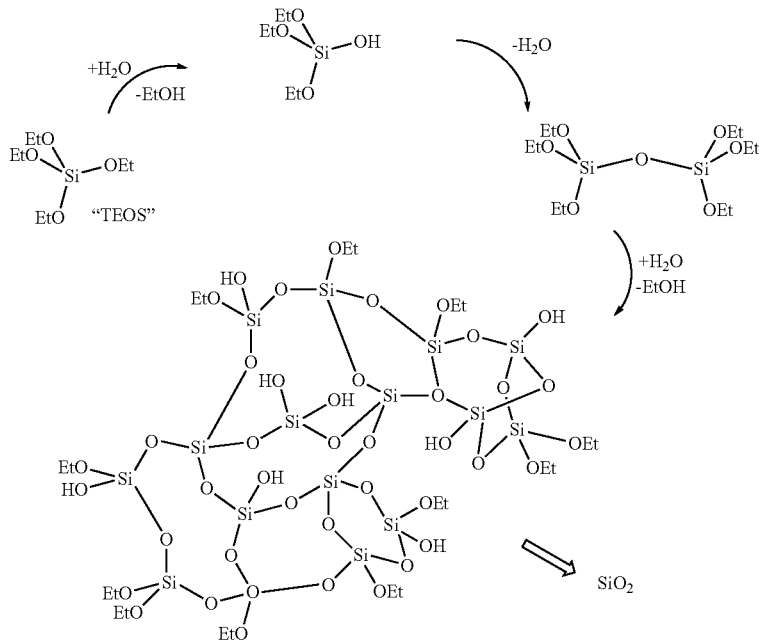

Figure 1B:
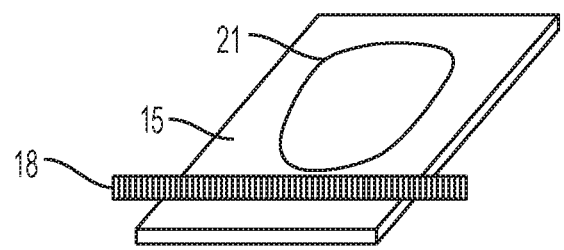
Figure 1C:
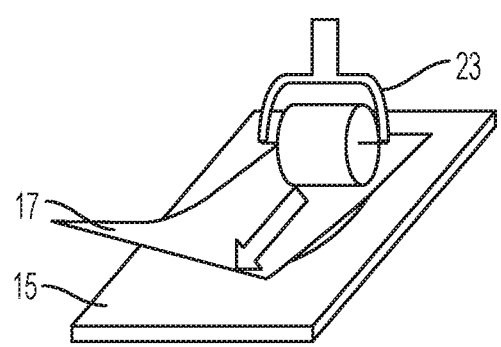

In an embodiment, a method of treating a textile for the subsequent reception of a printing ink, is shown in the schematic illustrations of FIGS. 1A-1C. The method shown in FIGS. 1A-1C is one example, and other methods of coating textiles with a solution can be used. In FIG. 1A, a coating solution 21 is applied on a glass plate 15. A coating rod 18 is used to spread the coating solution 21 on the glass plate 15 and is shown in FIG. 1B. The coating solution 21 is illustrated as spread on glass plate 15 in FIG. 1B. As shown in FIG. 1C, the textile or fabric 17 is then placed on the glass plate 15 and a roller 23 is used to immerse the textile 17 in the coating solution 21 (FIG. 1B) so that the coating solution 21 contacts all portions of the textile 17. After the textile or fabric 17 is coated with solution 21 the coating solution 21 is dried.

The coating solution 21 includes an orthosilicate, a water miscible solvent such as ethyl alcohol (EtOH), water ($H_2O$), ammonium hydroxide ($NH_4OH$). The coating solution 21 is well mixed prior to coating. The weight percent ranges for the coating solution 21 are from about 70 weight percent to about 85 weight percent of the water miscible solvent, from about 5 weight percent to about 15 weight percent water, from about 10 weight percent to about 20 weight percent $NH_4OH$ and from about 0.1 weight percent to about 2 weight percent TEOS.

In embodiments, solvents are mixtures of water and water-miscible polar solvents that can be included in the coating solution. In embodiments, water-soluble organic solvents include: alcohols, ketones, keto-alcohols, ethers and others, such as thiodiglycol, sulfolane, 2-pyrrolidone, 1,3-dimethyl-2-imidazolidinone and caprolactam; glycols such as, ethylene glycol, diethylene glycol, triethylene glycol, tetraethylene glycol, propylene glycol, dipropylene glycol, tripropylene glycol, trimethylene glycol, butylene glycol and hexylene glycol; polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

The thickness of the dried silica ($SiO_2$) layer on the fabric or textile 17 can be from about 0.5 microns to about 300 microns.

Other optional components in the coating solution 21 can include surfactants. Surfactants adjust the surface tension and wetting properties of the coating solution 21. In embodiments, the surfactants may include SDS (sodium dodecyl sulfonate), SDBS (sodium dodecyl benzenesulfonate), as well as non-ionic surfactants such as: Triton-X100 (ethoxylated nonylphenol). Other surfactants include ethoxylated acetylene diols (e.g. SURFYNOL® series from Air Products), ethoxylates and primary alcohols (e.g. NEODOL® series from Shell and TOMADOL® series from Tomah Products) and secondary alcohols (e.g. TERGITOL® series from Union Carbide), sulfosuccinates (e.g. Aerosol® series from Cytec), organosilicones (e.g. SILWET® series from GE Silicons) and fluoro surfactants (e.g. ZONYL® series from DuPont). In embodiments, surfactants are used in the amount of about 0.01 weight percent to about 5 weight percent of the total weight of the coating solution 21, or in embodiments from about 0.5 weight percent to about 2 weight percent, based on the total weight of the coating solution 21.

Textiles that are suitable for use of the pre-treatment disclosed herein include, for example, woven fabrics, knitted fabrics, and non-woven fabrics such as felt fabrics. The textiles may include fibers from any animal, plant and/or synthetic source such as, for example, wool, silk, cotton, linen, hemp, ramie, jute, acetate, acrylic fabric, latex, nylon, polyester, rayon, viscose, spandex, metallic composite, carbon or carbonized composite, and any combination thereof.

The process disclosed herein is highly suitable for garments made of one or more textile fabrics. An example of such a garment is a T-shirt.

The presently available inks for ink-jet printing include aqueous-based inks. The inks contain water, a humectant, a water soluble polymer, a surfactant and a colorant.

Aqueous-based inks are typically composed of water and a colorant, usually a dye or pigment dispersion, and may contain a number of additives for imparting certain features to the ink (e.g., improved stability and flow, feather resistance, and the like).

The term "colorant" as used herein describes a substance which imparts the desired color to the printed image. The colorant may be a pigment or a dye. Pigments are solid colorants with are typically suspended in the carrier of the ink composition, whereby dyes are liquid colorants which are dissolved in the carrier of the ink composition.

Apart for imparting the desired color to the textile, the colorant is selected suitable in terms of its chemical and physical properties. Example dye colorants that are suitable for use in embodiments include, without limitation, azo chrome complexes such as the commercially available Orasol black RLI, Orsal Red G and Cu phthalocyanine and similar azo-cobalt complexes. Example pigment colorants that are suitable for use in this context of the present invention include, without limitation, quinacridone, benzimidazolone, carbon black, phthalocyanine, diarylide, azo, titanium oxide and calcium carbonate. Example commercially available pigments can include Permajet, Renol and Microlith.

Preferably, the colorant content in the ink composition according to embodiments ranges from about 0.2% to about 40% of the total weight of the ink composition. In embodiments, the colorant content ranges from 1 to 10 weight percentages of the total weight of the ink composition.

In embodiments, solvents are mixtures of water and water-miscible polar solvents such as: methanol, ethanol, 2-propanol, acetone, tetrahydrofuran (THF), as well as less-volatile solvents such as DMF (dimethyl formamide), or NMP (N-methyl-2-pyrrolidone) can be used with the ink composition. In embodiments, water-soluble organic solvents include: alcohols, ketones, keto-alcohols, ethers and others, such as thiodiglycol, sulfolane, 2-pyrrolidone, 1,3-dimethyl-2-imidazolidinone and caprolactam; glycols such as, ethylene glycol, diethylene glycol, triethylene glycol, tetraethylene glycol, propylene glycol, dipropylene glycol, tripropylene glycol, trimethylene glycol, butylene glycol and hexylene glycol; polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

The ink composition may also contain a humectant, which may also function as a water miscible solvent, which preferably includes a glycol or dihydroxyglycolether, or mixture thereof, in which one or both hydroxy groups are secondary hydroxy groups, such as propane-1,2-diol, butane-2,3-diol, butane-1,3-diol and 3-(3-hydroxy-prop-2-oxy)propan-2-ol. Where the humectant has a primary hydroxy group, in embodiments this may be attached to a carbon atom adjacent to a carbon atom carrying a secondary or tertiary hydroxy group. The humectant may include up to a total of 10 percent by weight of a polyol, especially a glycol or dihydroxyglycolether, having two or more primary hydroxy groups, such as ethyleneglycol, propane-1,3-diol, butane-1,4-diol, 2-(2-hydroxyethoxy)ethanol and 24242-hydroxyethoxylethoxy) ethanol and/or an alcohol with a primary hydroxy group, such as ethanol, n-propanol and n-butanol. In the context of the humectant, the term "alcohol" means a compound having only one hydroxy group attached to an aliphatic carbon atom. The ink composition may contain from 5 weight percent to about 25 weight percent, or in embodiments, from 10 weight percent to 20 weight percent of humectant.

Figure 2:
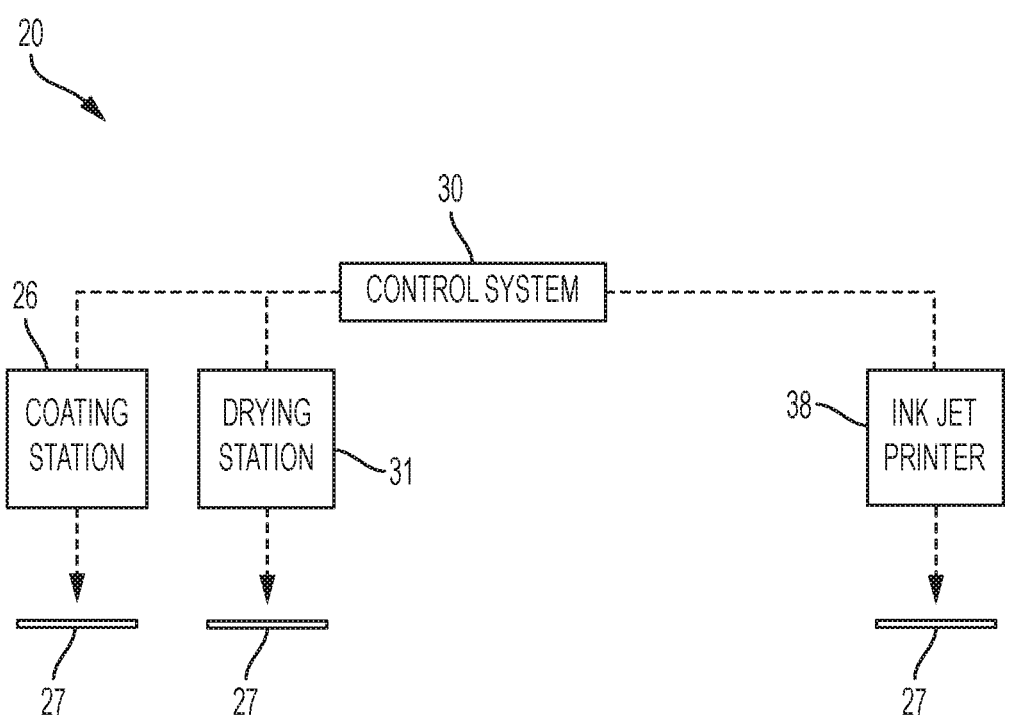
FIG. 2 shows a schematic depiction of a printing system for various embodiments disclosed herein.

FIG. 2 shows a printing system 20 for producing a textile having an image thereon according to various embodiments. The system 20 includes a coating station 26 for applying a coating solution to the textile 27. The textile 27 is dried at drying station 31 forming a silica network on the textile 27. The textile 27 is printed using an ink jet printer 38 to form an image on the silica network on textile 27. The printing system 20 can include a control system 30 coupled to the coating station 26, drying station 31 and ink jet printer 38. The control system 30 can be configured to provide instructions to, and/or otherwise control operation of coating station 26, drying station 31 and ink jet printer 38. The control system 30 may be mechanically or electrically connected to coating station 26, drying station 31 and ink jet printer 38. Control system 30 may be a computerized, mechanical, or electro-mechanical device capable of controlling the coating station 26, drying station 31 and ink jet printer 38. In one embodiment, control system 30 may be a computerized device (e.g., a programmable computer having a processor and memory) capable of providing operating instructions to the coating station 26, drying station 31 and ink jet printer 38. In another embodiment, control system 30 may include a mechanical device, capable of use by an operator. In this case, the operator may physically manipulate control system 30 (e.g., by pulling a lever), which may actuate the coating station 26, drying station 31 and ink jet printer 38. In another embodiment, control system 30 may be an electro-mechanical device.

Figure 3:
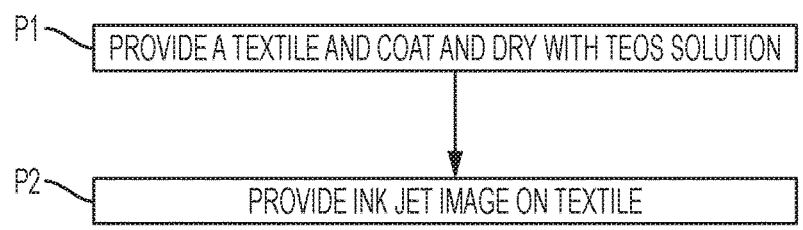
FIG. 3 shows a flow chart illustrating a method according to various embodiments disclosed herein.

FIG. 3 shows a flow chart illustrating a method performed according to various embodiments. As shown, the method can include the following processes:

Process P1: A textile is provided and coated with a TEOS solution and dried to form a silica network on the textile.

Process P2: A ink jet composition is coated on the silica network on the textile to form an image.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Preparation of TEOS Solution.

A TEOS/EtOH/water/NH$_4$OH solution was based was prepared by mixing 152 mL EtOH, 14 mL deionized water and 22 mL of NH$_4$OH was mixed. This was followed by addition of 1 mL TEOS. The mixture was stirred for 30 minutes, as it went from clear to cloudy. The weight percentages of the TEOS solution were approximately 78 weight percent EtOH, 9 weight percent water, 12.4 weight percent NH$_4$OH and 0.5 weight percent TEOS.

A polyester fabric was coated with the TEOS/EtOH/water/NH$_4$OH solution on a glass plate applied with a #22 Meyer rod, as shown in FIGS. 1A-1C. The coating was cured to form a silica network on the polyester fabric. The silica network showed good affinity for polyester.

An ink jet composition was applied to the polyester fabric with the cured TEOS/EtOH/water/NH$_4$OH solution. The ink jet composition showed good adherence to the silica network.

It will be appreciated that variants of the above-disclosed embodiments and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A method of printing an image on a textile, the method comprising:
    coating and curing the textile with a solution comprising an orthosilicate, a water miscible solvent, water and ammonium hydroxide ($NH_4OH$), thereby creating a silica network attached to the textile, wherein the solution comprises from 70 weight percent to 85 weight percent of the water miscible solvent, from 5 weight percent to 15 weight percent water, from 10 weight percent to 20 weight percent $NH_4OH$ and from 0.1 weight percent to 2 weight percent orthosilicate; and
    applying an ink composition to the silica network, forming an image on the silica network.

2. The method of claim 1, wherein the orthosilicate is selected from the group consisting of: tetraethyl orthosilicate (TEOS), tetramethyl orthosilicate (TMOS), tetraisopropoyl orthosilicate (TIPS) and tertrabutyl orthosilicate (TBOS).

3. The method of claim 1, wherein the water miscible solvent is selected from the group consisting of: alcohols, ketones, keto-alcohols, glycols, triols, ethers and ureas.

4. The method of claim 1, further comprising: curing the image after applying the ink composition.

5. The method of claim 1, wherein said ink composition comprises water, a humectant, a water-soluble polymer, a surfactant and a colorant.

6. The method of claim 1, wherein the textile is selected from the group consisting of a wool, silk, cotton, linen, hemp, ramie, jute, acetate, acrylic fabric, latex, nylon, polyester, rayon, viscose, spandex, metallic composite, carbon and carbonized composite.

7. The method of claim 1, wherein the textile comprises polyester.

8. A printed article, comprising:
    a fabric having a silica network on a surface of the fabric, wherein the silica network is formed by applying a solution comprising from 70 weight percent to 85 weight percent of a water miscible solvent, from 5 weight percent to 15 weight percent water, from 10 weight percent to 20 weight percent ammonium hydroxide ($NH_4OH$) and from about 0.1 weight percent to about 2 weight percent orthosilicate to the fabric and curing the solution; and
    a cured ink composition disposed on the silica network on the surface of the fabric.

9. The printed article of claim 8, wherein said ink composition comprises water, a humectant, a water-soluble polymer, a surfactant and a colorant.

10. The printed article of claim 8, wherein the fabric is selected from the group consisting of a wool, silk, cotton, linen, hemp, ramie, jute, acetate, acrylic fabric, latex, nylon, polyester, rayon, viscose, spandex, metallic composite, carbon and carbonized composite.

11. The printed article of claim 8, wherein a thickness of the silica network is from about 0.5 microns to about 300 microns.

* * * * *